(12) United States Patent
Bar-Or et al.

(10) Patent No.: US 7,774,189 B2
(45) Date of Patent: Aug. 10, 2010

(54) SYSTEM AND METHOD FOR SIMULATING DATA FLOW USING DATAFLOW COMPUTING SYSTEM

(75) Inventors: Amir Bar-Or, Newton, MA (US); Michael James Beckerle, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 11/566,193

(22) Filed: Dec. 1, 2006

(65) Prior Publication Data

US 2008/0133209 A1 Jun. 5, 2008

(51) Int. Cl.
*G06F 9/44* (2006.01)
*G06F 9/45* (2006.01)
*G06F 15/00* (2006.01)

(52) U.S. Cl. .............. 703/21; 703/13; 703/16; 703/17; 703/20; 717/155; 717/156; 712/21; 712/22; 712/25; 712/30

(58) Field of Classification Search ............ 703/17, 703/21, 13, 16, 20; 717/155–156; 707/2, 707/102; 712/21, 22, 25, 30
See application file for complete search history.

(56) References Cited

U.S. PATENT DOCUMENTS

| | | | |
|---|---|---|---|
| 4,145,733 A | | 3/1979 | Misunas et al. |
| 5,021,947 A * | | 6/1991 | Campbell et al. .......... 712/25 |
| 5,465,372 A * | | 11/1995 | Gottlieb et al. ........... 712/25 |
| 5,555,201 A * | | 9/1996 | Dangelo et al. ............ 716/1 |
| 5,603,018 A | | 2/1997 | Terada et al. |
| 5,724,570 A * | | 3/1998 | Zeller et al. ................ 707/3 |
| 5,801,958 A * | | 9/1998 | Dangelo et al. ........... 716/18 |
| 5,806,062 A | | 9/1998 | Chen et al. |
| 5,822,593 A * | | 10/1998 | Lamping et al. ......... 717/161 |
| 6,192,504 B1 * | | 2/2001 | Pfluger et al. ............. 716/1 |
| 6,311,265 B1 | | 10/2001 | Beckerle et al. |
| 6,601,058 B2 | | 7/2003 | Forster et al. .............. 707/3 |
| 6,654,952 B1 | | 11/2003 | Nair et al. |
| 6,772,398 B2 | | 8/2004 | Saluja et al. |
| 6,801,938 B1 | | 10/2004 | Bookman et al. |
| 6,832,357 B2 | | 12/2004 | Saluja et al. |

(Continued)

OTHER PUBLICATIONS

J. B. Dennis and D. P. Misunas, "A Preliminary Architecture for a Basic Data-Flow Processor", 1975, pp. 126-132.*

(Continued)

*Primary Examiner*—Kamini S Shah
*Assistant Examiner*—Kibrom Gebresilassie
(74) *Attorney, Agent, or Firm*—Janaki K. Davda; Konrad Raynes & Victor LLP

(57) ABSTRACT

A system and method for implementing a unified model for integration systems is presented. A user provides inputs to an integrated language engine for placing operator components and arc components onto a dataflow diagram. Operator components include data ports for expressing data flow, and also include meta-ports for expressing control flow. Arc components connect operator components together for data and control information to flow between the operator components. The dataflow diagram is a directed acyclic graph that expresses an application without including artificial boundaries during the application design process. Once the integrated language engine generates the dataflow diagram, the integrated language engine compiles the dataflow diagram to generated application code.

35 Claims, 13 Drawing Sheets

U.S. PATENT DOCUMENTS

| | | | |
|---|---|---|---|
| 6,918,111 | B1 | 7/2005 | Damron et al. |
| 6,954,749 | B2 | 10/2005 | Greenblatt et al. |
| 7,080,088 | B1 | 7/2006 | Lau |
| 7,254,590 | B2 | 8/2007 | Mudunuri et al. |
| 7,299,458 | B2 * | 11/2007 | Hammes ............... 717/133 |
| 7,392,514 | B2 * | 6/2008 | Edwards ............... 717/156 |
| 7,467,371 | B1 * | 12/2008 | Meredith et al. ........... 717/104 |
| 2002/0080181 | A1 | 6/2002 | Razdow et al. ........... 345/772 |
| 2003/0014379 | A1 | 1/2003 | Saias et al. ............... 706/45 |
| 2003/0061575 | A1 | 3/2003 | Saluja et al. ............... 716/2 |
| 2003/0191765 | A1 * | 10/2003 | Bargh et al. ............ 707/100 |
| 2003/0200538 | A1 | 10/2003 | Ebeling et al. |
| 2004/0073545 | A1 | 4/2004 | Greenblatt et al. ......... 707/3 |
| 2004/0117772 | A1 * | 6/2004 | Brand et al. ............... 717/132 |
| 2004/0123072 | A1 | 6/2004 | Kailas et al. ............... 712/23 |
| 2004/0205058 | A1 | 10/2004 | Kiji |
| 2004/0207665 | A1 | 10/2004 | Mathur |
| 2004/0225999 | A1 | 11/2004 | Nuss |
| 2005/0071359 | A1 | 3/2005 | Elandassery et al. |
| 2005/0097561 | A1 | 5/2005 | Schumacher et al. ........ 718/106 |
| 2005/0125436 | A1 | 6/2005 | Mudunuri et al. ......... 707/102 |
| 2005/0251527 | A1 | 11/2005 | Phillips et al. ............. 707/101 |
| 2005/0257194 | A1 | 11/2005 | Morrow et al. |
| 2005/0257195 | A1 * | 11/2005 | Morrow et al. ............. 717/109 |
| 2006/0005173 | A1 * | 1/2006 | Eng ............................. 717/140 |
| 2006/0048113 | A1 | 3/2006 | Ozone et al. ............... 717/144 |
| 2006/0277392 | A1 | 12/2006 | Bittner, Jr. |
| 2008/0052687 | A1 | 2/2008 | Gonzales-Tuchmann et al. |
| 2008/0082984 | A1 * | 4/2008 | McDaniel ................... 718/106 |
| 2008/0134158 | A1 | 6/2008 | Salz et al. |
| 2009/0063515 | A1 | 3/2009 | Bar-or et al. |
| 2009/0063583 | A1 * | 3/2009 | Bar-Or et al. ............... 707/203 |
| 2009/0064157 | A1 * | 3/2009 | Bar-Or et al. ............... 718/104 |

OTHER PUBLICATIONS

T. Miyazaki, and E. Lee, "Code Generation by Using Integer-Controlled Dataflow Graph", 1997, pp. 1-4.*

F. Neubauer, A. Hoheisel, J. Geiler, "Workflow-based Grid Applications", 2005 Elsevier, pp. 1-15.*

W. Weimer, G. C. Necula, "Finding and Preventing Run-Time Error Handling Mistakes", ACM 2004, pp. 419-431.*

Cardelli, L., and P. Wegner, "On Understanding Types, Data Abstraction, and Polymorphism", Computing Surveys, vol. 17, No. 4, Dec. 1985, pp. 471-522.

Florescu, D., C. Hillery, D. Kossmann, P. Lucas, F. Riccardi, T. Westmann, M.J. Carey, A. Sundarajan, and G. Agrawal, "The BEA/XQRL Streaming XQuery Processor", Proceedings of the 29th VLDB Conference, 2003, 12 pp.

Koch, C., S. Sherzinger, N. Schweikardt, and B. Stegmaier, "FluXQuery: An Optimizing XQuery Processor for Streaming XML Data", Proceedings of the 30th VLDB Conference, 2004, pp. 1309-1312.

LDODDS.COM, "XML Pipeline", [online], updated on Aug. 21, 2002, [retrieved on Apr. 9, 2007], retrieved from the Internet at <URL: http://www.ldodds.com/wordtin/wiki.jsp?page=XMLPipeline>, 2 pp.

Leymann, F., and D. Roller, "Production Workflow: Concepts and Techniques", Sep. 1999, Prentice Hall PTR, 5 pp.

Morgenthal, J.P., "Enterprise Information Integration: A Pragmatic Approach", May 30, 2005, Lulu.com, 4 pp.

Morrison, J.P., "Data Responsive Modular Interleaved Task Programming System", IBM Technical Disclosure Bulletin, Jan. 1971, pp. 2425-2426.

Morrison, J.P., "Data Stream Linkage Mechanism", IBM System Journal, vol. 17, No. 4, 1978, pp. 383-408.

Morrison, J.P., "Flow-Based Programming: A New Approach to Application Development", Van Nostrand Reinhold, New York, 1994, Chapter 10, 13 pp.

Pal, S., I. Cseri, O. Seeliger, M. Rys, G. Schaller, W. Yu, D. Tomic, A. Baras, B. Berg, D. Churin, and E. Kogan, "XQuery Implementation in a Relational Database System", Proceedings of the 31st VLDB Conference, 2005, pp. 1175-1186.

W3C, "XSL Transformations (XSLT) Version 2.0", [online], Jan. 23, 2007, [retrieved on Jun. 20, 2008], retrieved from the Internet at <URL: http://www.w3.org/TR/xslt20>, 50 pp.

Wikipedia, "Flow-based Programming", [online], modified Jun. 12, 2008, [retrieved on Jun. 26, 2008], retrieved from the Internet at <URL: http://en.wikipedia.org/wiki/Flow-based_programming>, 7 pp.

Wikipedia, "XML Pipeline", [online], modified Apr. 1, 2008, [retrieved on Apr. 19, 2008], retrieved from the Internet at <URL: http://en.wikipedia.org/wiki/XML_pipeline>, 4 pp.

U.S. Appl. No. 12/147,408, filed Jun. 26, 2008, entitled "Pipeline Optimization Based on Polymorphic Schema Knowledge", invented by A. Bar-Or and M.J. Beckerle, 26 pp.

Bowers et al., "Enabling Scientific Workflow Reuse Through Structured Composition of Dataflow and Control-Flow," IEEE Computer Society, Proceedings of the 22$^{nd}$ International Conference on Data Engineering Workshops, 2006.

Yu et al., "A New Approach for the Forward and Backward Substitutions of Parallel Solution of Sparse Linear Equations—Based on Dataflow Architecture," IEEE Transactions on Power Systems, vol. 5, No. 2, May 1990, pp. 621-627.

Kelly et al., "Compilation of XSLT into Dataflow Graphs for Web Service Composition," Proceedings of the Sixth IEEE International Symposium on Cluster Computing and the Grid, 2006.

Arvand et al., "Executing a Program on the MIT Tagged-Token Dataflow Architecutre," IEEE Transactions on Computer, vol. 39, No. 3, Mar. 1990, pp. 300-318.

* cited by examiner

SYSTEM AND METHOD FOR SIMULATING DATA FLOW USING DATAFLOW COMPUTING SYSTEM

BACKGROUND OF THE INVENTION

1. Technical Field

The present invention relates to a system and method for implementing a unified model for integration systems. More particularly, the present invention relates to a system and method for using a unified model for expressing an application in a dataflow diagram without artificial boundaries that, in turn, allows for greater application optimization.

2. Description of the Related Art

Applications in the integration world are typically distinguished in categories such as Batch, Transactional and Continuous. Batch Integration Applications (IA) are mostly used where a new integrated solution replaces obsolete custom-built disparate applications and migration of the existing data is required. Transactional IA emerged mainly in the form of Business Process Management (BPM), where various applications implement a business process by exchanging requests and replies with each other under transaction guarantees. And, continuous IAs are emerging applications in the decision support domain. Complex Event Processing (CEP), Event Driven Architecture (EDA), Real-time Data Mining & Knowledge Extraction, Business Activity Monitoring (BAM) are all examples of continuous applications that continuously process time sequenced data from disparate applications to provide better understanding of the data that flows in the organization.

Dominant technologies in the world of enterprise integration are ETL (Extract, Transform, Load), EAI (Enterprise Application Integration) and EII (Enterprise Information Integration). Each of these technologies has advantages and disadvantages compared to the others and, therefore, none of these technologies prevails. Although these technologies have different capabilities, they still share many concepts and components, and in many times one technology may be used instead of the other.

An SQL (Select Query Language) model is the model behind EII systems that relational databases are based on. This model expressed in SQL is transformed into a dataflow tree directed graph. The graph vertices are set-operators and data sets flow between the operators as soon as they are available. The model behind ETL systems is also a dataflow model that is similar to SQL model although this model can express any directed acyclic graph rather than just tree graphs. The model behind EAI systems is the workflow model. The model can be expressed in BPEL and represent directed acyclic graphs where vertices are activities that are executed once on the incoming data.

A challenge found is that existing art has artificial distinctions that produce substantial redundancy. In addition, existing art does not provide a solution for continuous applications. Another challenge found is that each of the existing models has disadvantages compared to the other models and, therefore, selecting a system and model to use for designing an application may not always be clear to a solutions architect. In addition, many solutions may not be accomplished using existing models because of their disadvantages. As a result, a solutions architect may require a custom solution that is both expensive to develop and maintain. Furthermore, custom solutions are typically lower quality because the packaged software undergoes more rigorous testing.

What is needed, therefore, is a system and method that uses a unified model that encompasses the advantages of existing system models for expressing applications.

SUMMARY

It has been discovered that the aforementioned challenges are resolved using a system, method, and computer program product for simulating data flow using a dataflow diagram in a dataflow computing system. The dataflow diagram includes a plurality of operators that each includes at least one input port or at least one output port. The dataflow diagram also includes a plurality of arcs that each connect one of the operator's output ports to a different operator's input port. In the dataflow diagram, a plurality of data items flow in streams along the arcs between the operators. A first operator groups the plurality of data items into a particle and performs computations on the particle grouping, which results in a computed plurality of data items. The first operator transmits the computed plurality of data items over one of the arcs to a second operator. In addition, the first operator produces control data items at one of its meta ports based upon meta-state transitions that are in response to the computations on the particle grouping. Finally, the first operator transmits the control data items to another operator that, in turn, controls the flow of the computed plurality of data items based upon the control data items.

In one embodiment, the system, method, and program product use the control data items to control the flow of the computed plurality of data items using a gate operator. In this embodiment, the gate operator prevents the computed plurality of data items from reaching a different operator until the control data items instruct the gate operator to provide the computed plurality of data items to the different operator.

In one embodiment, the system, method, and program product transmit the control data items to a second operator that instruct the second operator a time at which to process the computed plurality of data items. In another embodiment, the system, method, and program product subscribes the arc connected to the meta port to receiving only a subset of the plurality of control data items.

In one embodiment, the system, method, and program product group the particle corresponding to a repeating portion of hierarchy in a hierarchical data model of the plurality of data items flowing on the plurality of arcs.

In one embodiment, the system, method, and program product couple the plurality of control data items to external resource manipulation in order to indicate the start of or completion of the external resource manipulation. In another embodiment, the system, method, and program product include parallel execution of the plurality of data items using the plurality of operators. In yet another embodiment, the system, method, and program product select the parallel execution from the group consisting of a pipelined execution and a data-parallel execution.

In one embodiment, the system, method, and program product include one or more stateful operators that accumulate state across the plurality of data items included in the particle.

In one embodiment, the system, method, and program product compile the dataflow diagram into sequential executable code. In another embodiment the system, method, and program product include a meta-state at the first operator that corresponds to a current processing state associated with the computations performed on the plurality of data items included in the particle. In yet another embodiment, the system, method, and program product express a control dependency between a plurality of activities.

In one embodiment, the system, method, and program product specify the first operator and the second operator as independent processing constructs.

In one embodiment, the system, method, and program product include a block in the data flow diagram that includes the first operator and the second operator. In another embodiment, the system, method, and program product include a block meta-state that corresponds to meta-states associated with the first operator and the second operator. In yet another embodiment, the system, method, and program product include a block meta port on the block that produces block control data based on transitions of the block meta-state.

In one embodiment, the system, method, and program product use the dataflow diagram to correspond to a batch data processing application. In another embodiment, the system, method, and program product use the dataflow diagram to correspond to a stream data processing application. In yet another embodiment, the system, method, and program product use the dataflow diagram to correspond to an event processing application. In yet another embodiment, the system, method, and program product include graphical notations in the data flow diagram. In yet another embodiment, the system, method, and program product include a non-graphical language implementation in the data flow diagram.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
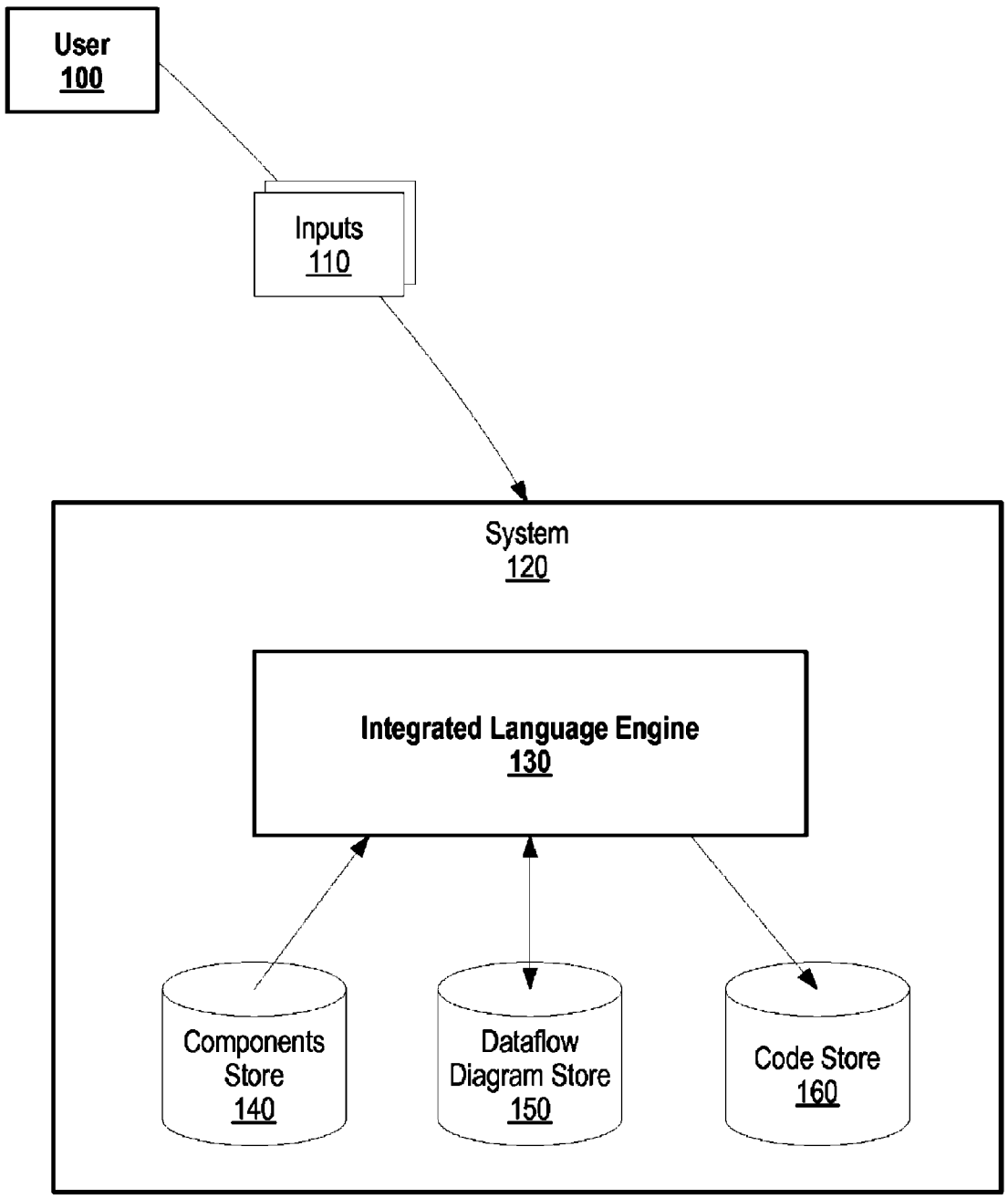
FIG. 1 is a diagram showing a user creating a dataflow diagram based upon a unified integration model.

FIG. 1 is a diagram showing a user creating a dataflow diagram based upon a unified integration model. User 100 provides inputs 110 to integrated language engine 130, which uses a unified integration model to generate a dataflow diagram. In turn, integrated language engine 130 compiles the dataflow diagram to create application code.

System 120 includes integrated language engine 130, components store 140, dataflow diagram store 150, and code store 160. Integrated language engine 130 receives inputs 110 from user 100 for creating a dataflow diagram. A dataflow diagram is a directed acyclic graph that includes components such as operators, arcs, and blocks to express an application. Using unified model components, artificial boundaries are not placed during the application design process, thus allowing optimizations to determine how to implement different design aspects in different ways (see FIG. 12 and corresponding text for further details). Components store 140, dataflow diagram store 150, and code store 160 may be stored on a nonvolatile storage area, such as a computer hard drive.

Integrated language engine 130 retrieves components from components store 140 corresponding to inputs 110, and inserts the components, such as operators and/or arcs, at locations specified by user 100 on a dataflow diagram. When user 100 is finished editing the dataflow diagram, integrated language engine 130 compiles the dataflow diagram and stores the compiled code in code store 160.

Integrated language engine 130 provides user 100 with the ability to design a complex integration involving combinations of transactions, batches, streaming and event-driven behavior in a single graphical design paradigm. In addition, integrated language engine 130 also provides user 100 with the ability to express such a design in a single tool without forcing the use of different tools for different eventual execution contexts too early in the design process.

Figure 2:
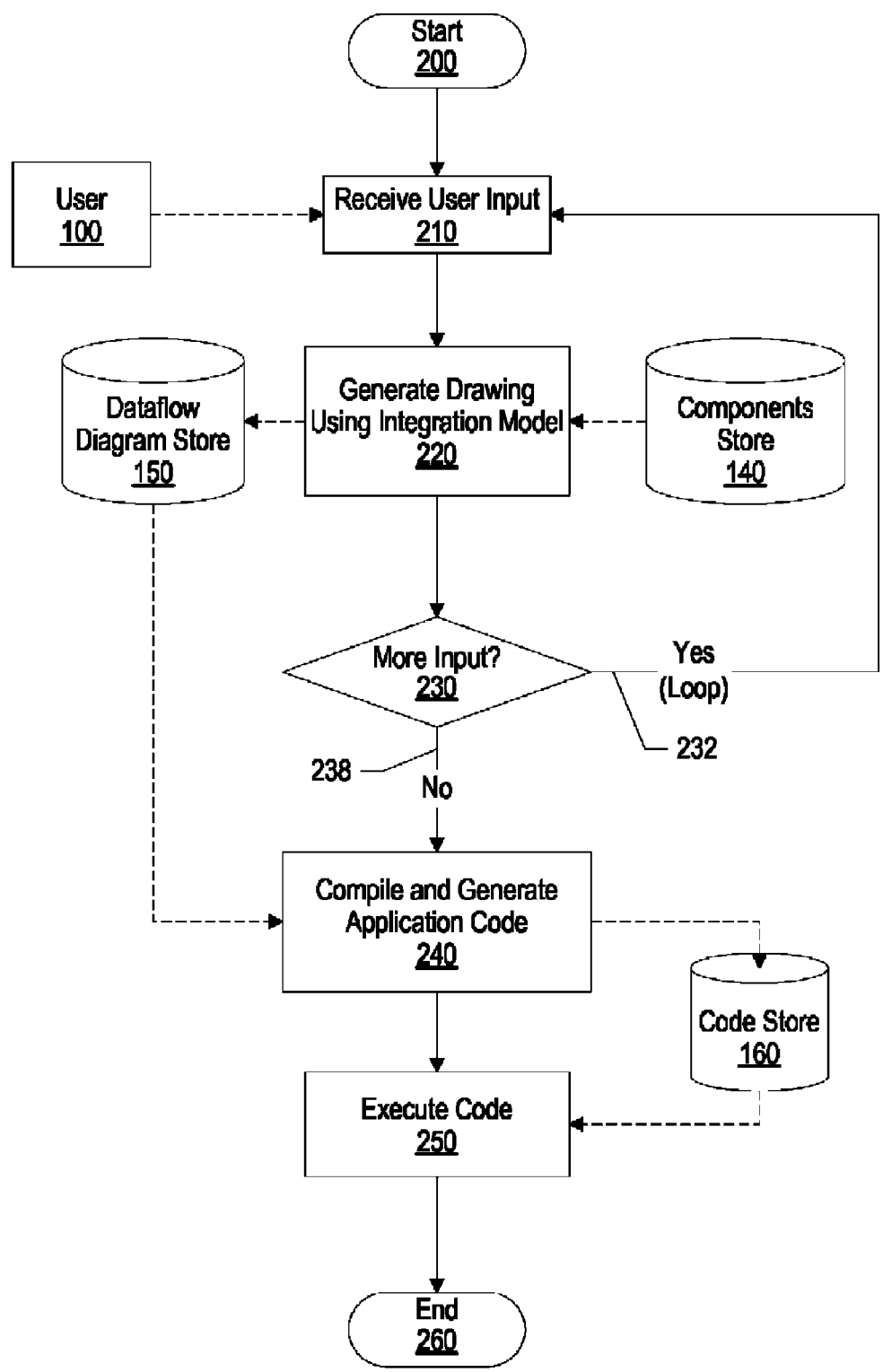
FIG. 2 is a flowchart showing steps taken in generating application code using a unified integration model.

FIG. 2 is a flowchart showing steps taken in generating application code using a unified integration model. Processing commences at 200, whereupon processing receives input from user 100 at step 210. For example, user 100 may select a unified model component, such as an operator, an arc, or a block, to insert into a dataflow diagram.

At step 220, processing retrieves unified model components from components store 140, begins generating a dataflow diagram, which is stored in dataflow diagram store 150. The dataflow diagram may correspond to applications such as a batch data processing application, a stream data processing application, or an event processing application. The dataflow diagram may include graphical notations or a non-graphical language implementation. Components store 140 and dataflow diagram store 150 are the same as that shown in FIG. 1.

A determination is made as to whether user 100 wishes to provide more input regarding the dataflow diagram, such as adding more operators and/or connecting operators using arcs (decision 230). If user 100 wishes to provide more input, decision 230 branches to "Yes" branch 232 which loops back to process more user input. This looping continues until user 100 is finished editing the dataflow diagram, at which point decision 230 branches to "No" branch 238.

At step 240, processing compiles the dataflow diagram stored in drawings store 150 using a compiler and optimizer, and stores the compiled code in code store 160. Processing, at step 250, executes the application code and ends at 260. Code store 160 is the same as that shown in FIG. 1.

Figure 3:
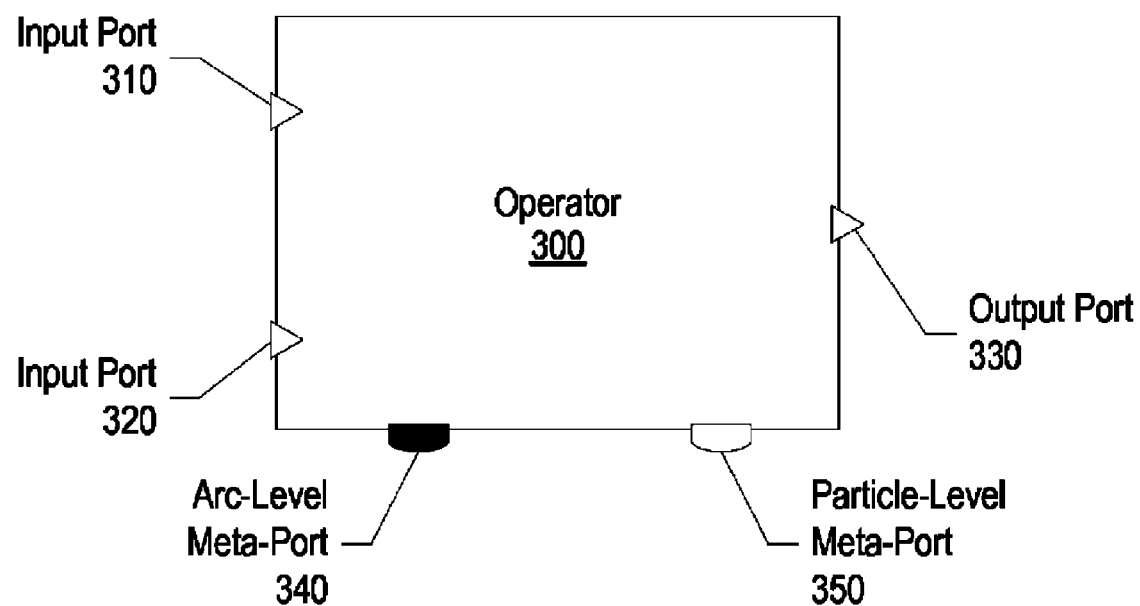
FIG. 3 is a diagram showing an operator component's input ports, output ports, and meta-ports.

FIG. 3 is a diagram showing an operator component's input ports, output ports, and meta-ports. Operator 300 reads data from an external resource, writes data to an external resource, and applies data transformations. In general, operator 300 consumes data from incoming arcs through input ports 310 and 320, and produces data on outgoing arcs through output port 330. In one embodiment, a unified integration model provides multiple operator types as built-in operators to provide common data access and transformations. In this embodiment, when a user requires other operator types, the user may create custom operators and then integrate them into the unified integration model.

Operator 300 includes two "meta-ports" that operator 300 produces control data items, which are arc-level meta-port 340 and particle-level meta-port 350. Arc-level meta-port 340 provides an "arc-level" meta-state, which holds operator 300's state execution from a process initialization point to a process termination point. Particle-level meta-port 350 provides a "particle-level" meta-state, which provides an execution state of an input particle at any given point of time.

In addition, meta-ports 340 and 350 are associated with a "firing rule," which defines meta-state transitions in which a meta-state particle proceeds through a meta-port. In one embodiment, particle-level meta-port 350 may send multiple particles for a single incoming particle when more than one transition is defined.

In addition, operator 300 obeys a producer-consumer model where data is being moved by value and not by reference. In other words, particles do not share data with other particles. Operator 300 maintains a meta-state for each input particle that holds the state of the execution. When operator 300 connects to another operator, asynchronous communication may be established. In one embodiment, a user may change to a synchronous communication between two operators. In this embodiment, the change corresponds to performance optimization, and the semantics may stay asynchronous.

Operator 300 may be "stateful" or "stateless" across input particles. When stateful, operator 300 maintains an internal state between steps of execution. For example, a window operator is an operator that collects multiple particles and generates a single particle based on a given window definition. In each execution step, the window operator consumes a single particle and updates its internal state until the window ends and the output particle is produced.

When stateless, operator 300 does not maintain an internal state between execution steps. For example, in a single execution step, a sort operator consumes a single particle, sorts the underling contents inside the particle, and produces a single particle containing the sorted content. At the end of the execution step, the sort operator does not preserve a state.

Figure 4A:
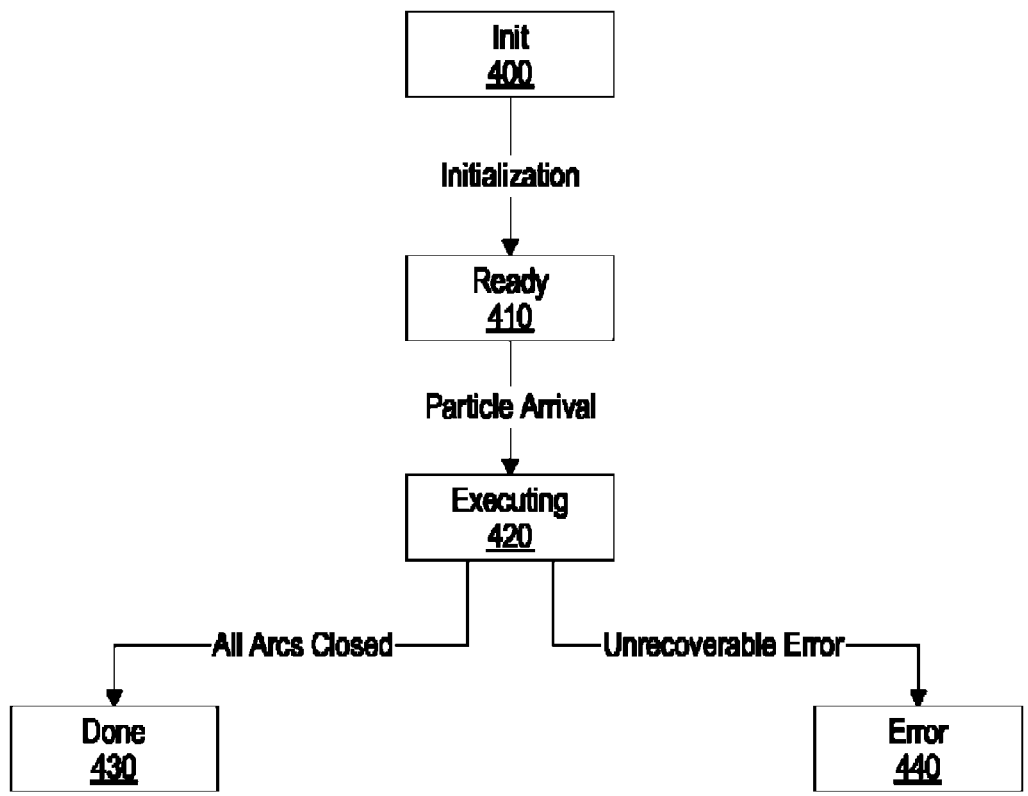
FIG. 4A is a state diagram for an operator component's arc-level meta-state.

FIG. 4A is a state diagram for an operator component's arc-level meta-state. The arc-level meta-state holds the state of the operator execution from a process initialization point to a process termination point. The arc-level meta-state commences at initialization state 400 and proceeds to ready state 410. When a particle arrives, the operator transitions to executing state 420. After execution, the operator transitions to done state 430 when arcs close, or transitions to error state 440 when the operator encounters an unrecoverable error.

Figure 4B:
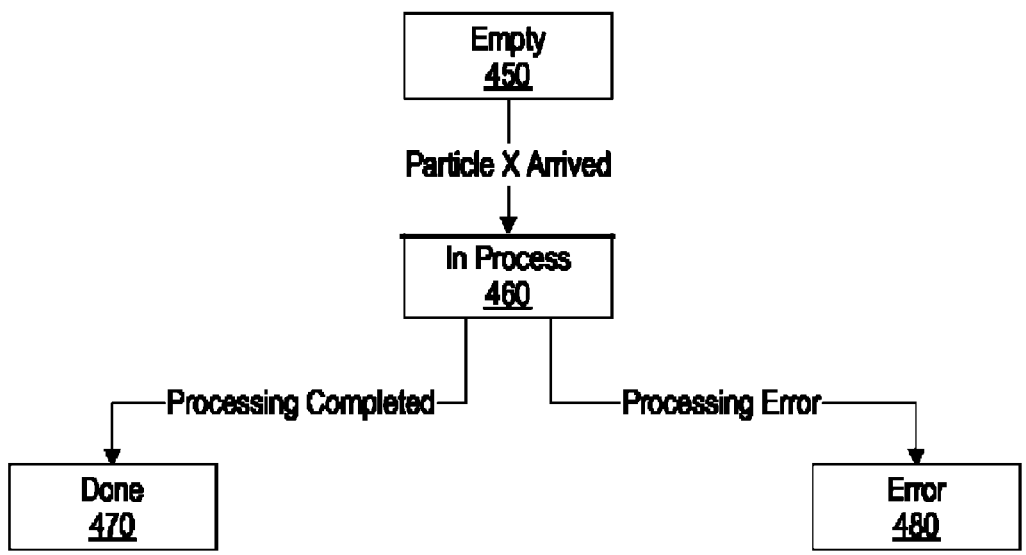
FIG. 4B is a state diagram for an operator component's particle-level meta-state.

FIG. 4B is a state diagram for an operator component's particle-level meta-state. The particle-level meta-state includes the state of the execution of an input particle at any given point of time. An operator's particle-level meta-state commences at empty state 450. When a particle arrives, the operator transitions to "In process" state 460. From in process state 460, the operators particle-level state transitions to done state 470 when processing completes, or transitions to error state 480 when processing encounters an error.

Figure 5:
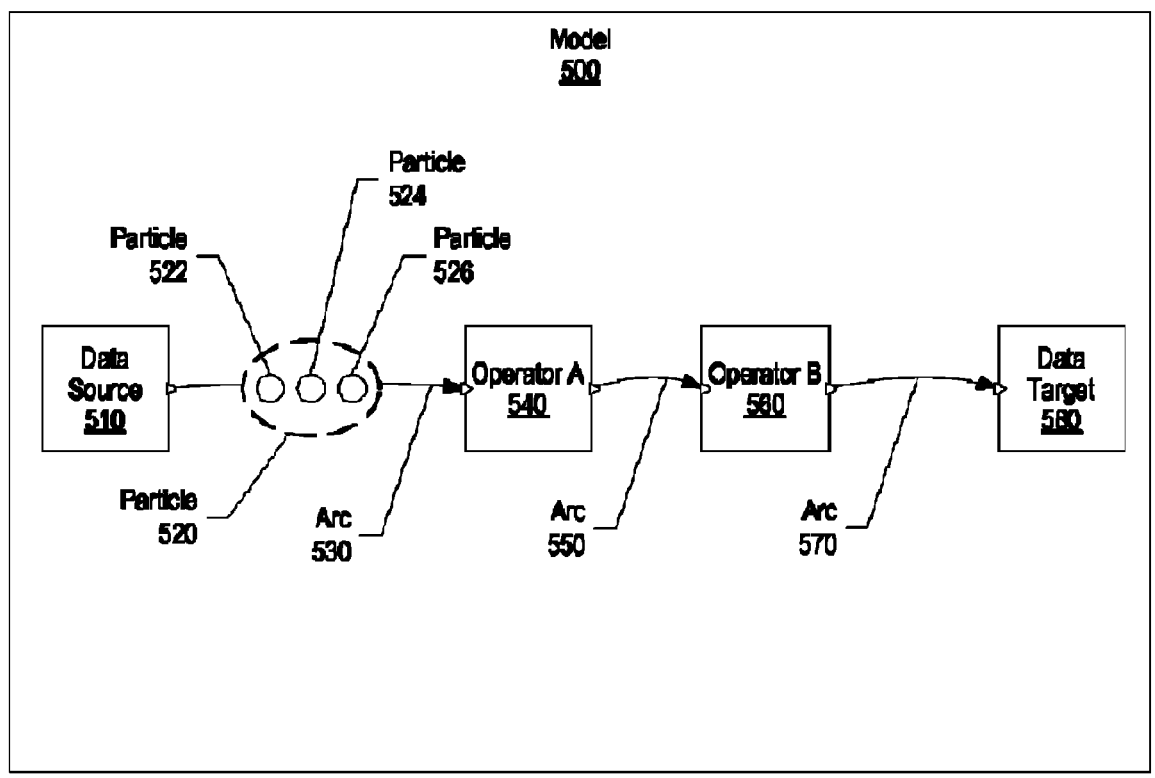
FIG. 5 is a diagram showing a unified integration model's various components.

FIG. 5 is a diagram showing a unified integration model's various components. Model 500 includes data source 510, operator A 540, operator B 560, and data target 580. Arc 530 connects data source 510's output port to operator A 540's input port. Arc 550 connects operator A 540's output port to operator B 560's input port. And, arc 570 connects operator B 560's output port to data target 580's input port. Each of arcs 530, 550, and 570 represent dataflow between its connected operators. In one embodiment, operator A 540 and operator B 560 may be independent processing constructs.

Operator A 540 and operator B 560 execute corresponding algorithms in "steps." In each step, an operator consumes a single particle from an input port and produces a finite integer number of particles on each of its output ports.

FIG. 5 shows that particle 520 travels along arc 530. As can be seen, particle 520 includes particles 522-526. Each of particles 522-526 is a unit of data that may be consumed or produced by the operators in their entirety. In a given point of time, arcs 530, 550, and 570 either contains an ordered sequence of particles, or is in a closed state. Each particle on an arc may be uniquely identified among a union of particles included in that arc. In one embodiment, an arc may be a finite arc or an infinite arc. A finite arc has a "close time" t1 that, for every time t2 where t2>t1, the arc does not include particles and is in a closed state. In contrast, an infinite arc has no close time.

The order of the particles in an arc is the order of arrival (FIFO). However, the order of the particles is only important when the operator is a stateful operator. Thus, in implementation, a system might process particles out of order for a stateless operator and reorder the particles again if necessary before a stateful operator. When a user explicitly creates an execution branch (for example by using the Switch operator), the user may be responsible for re-achieving the execution order when necessary through available constructs. In one embodiment, the invention described herein may automatically reestablish the execution order.

Regarding particles 520-526, each particle is strongly typed by its associated schema, and particles on the same arc adhere to the same schema.

Figure 6:
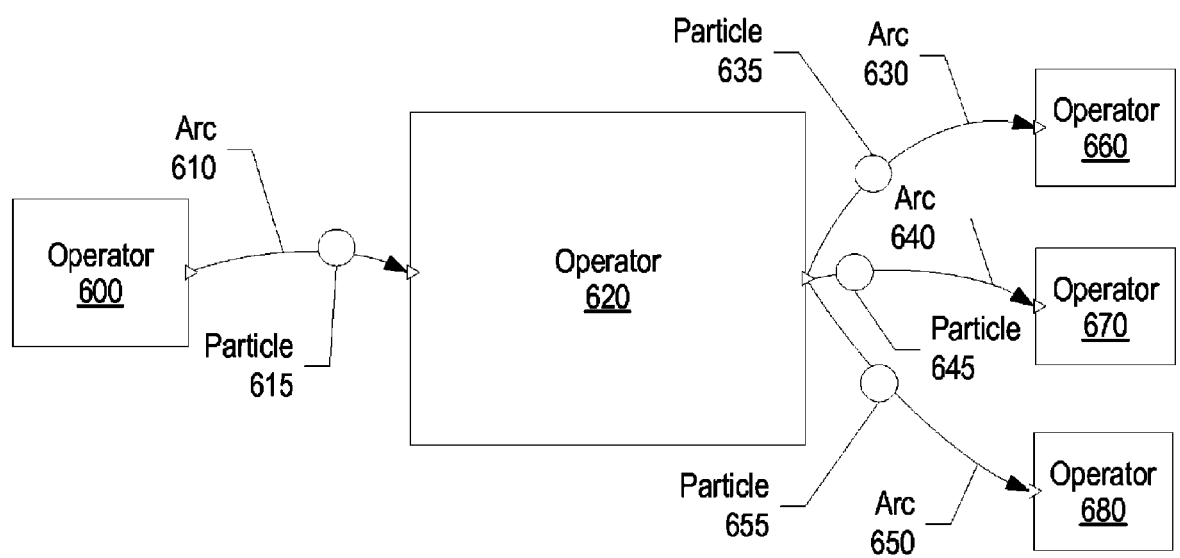
FIG. 6 is a diagram showing an operator receiving particles over an arc and providing particles to other operations over other arcs.

FIG. 6 is a diagram showing an operator receiving particles over an arc and providing particles to other operations over other arcs. Operator 620 is connected to arcs via data ports. A single input port connects to a single arc while a single output port may be connected to multiple arcs for replication. A port may constrain the types of arcs (Finite data arc, Infinite data arc) and the type of data (via schemas) that it is connected.

Operator 600 provides particle 615 to operator 620 over arc 610. In turn, operator 620 processes particle 615 and provides particles 635, 645, and 655 to operators 660, 670, and 680 through arcs 630, 640, and 650, respectively.

Figure 7:
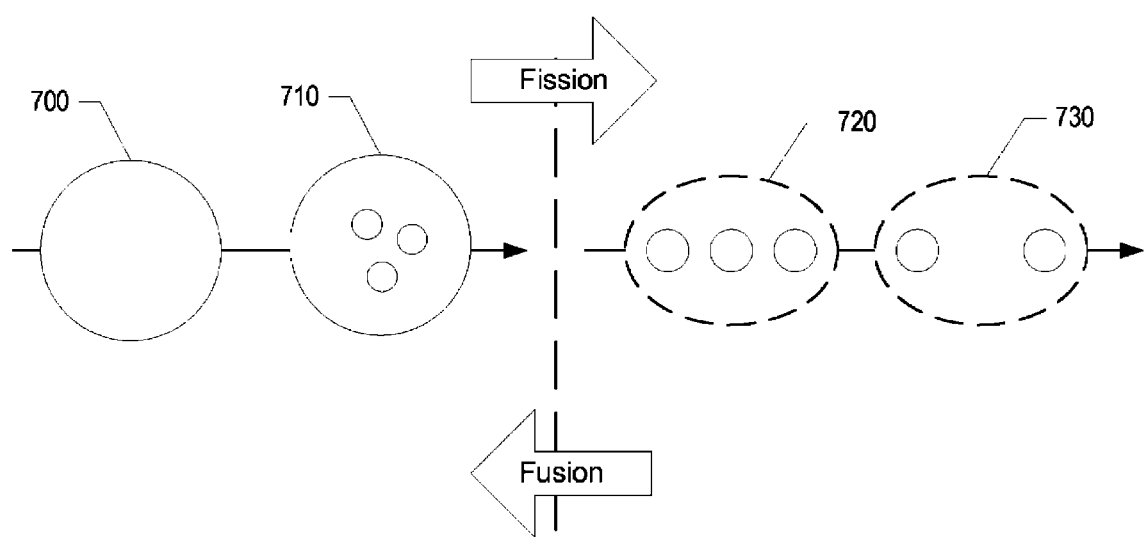
FIG. 7 is a diagram of "fusing" particles and "fissing" particles within a unified integration model.

FIG. 7 is a diagram of "fusing" particles and "fissing" particles within a unified integration model. Using the invention described herein, particles may be "fissioned" into smaller particles and smaller particles may be "fused" into bigger particles. FIG. 7 shows that particles 700 and 710 may be fissioned into particles 720 and 730. Likewise, particles 720 and 730 may be fused into particles 700 and 710.

Fissioning and fusing particles achieve a change of control granularity. Using a system that processes customer orders as an example, each order includes a set of parts. In this example, a single customer order may be viewed as a particle while the parts of the order are the sub-particles within that particle. The invention described herein allows the user to describe dependencies between operations in a granularity level of the parts or in a granularity level of the order. When a user expresses the dependency only in granularity level of an order, the system may further optimize the execution by processing the parts in parallel (e.g., as a wave. See below.). In addition, through this duality, the unified integration model combines workflow model semantics with dataflow model semantics.

Figure 8:
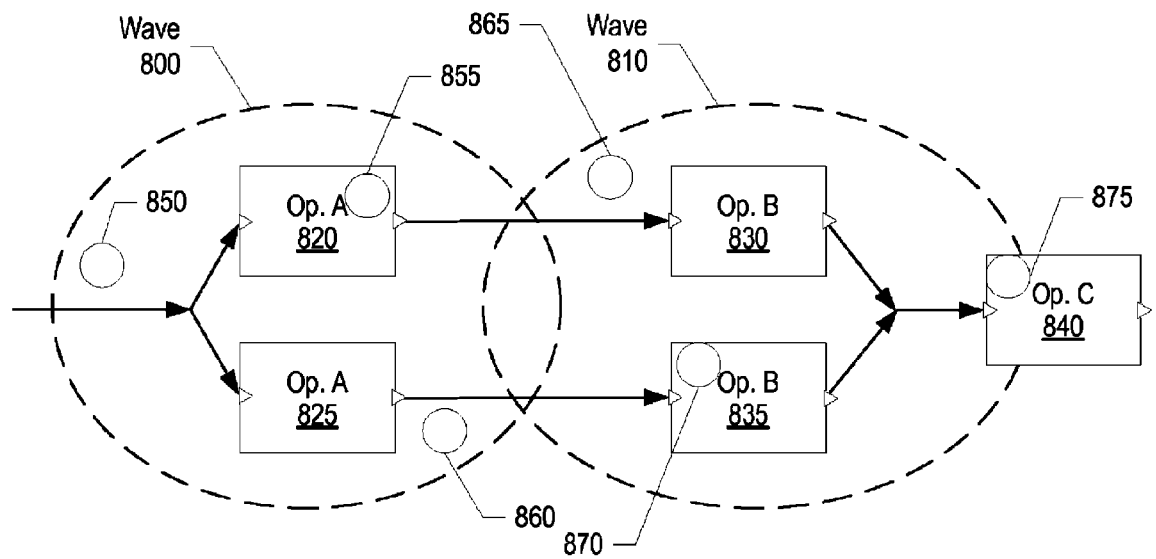
FIG. 8 is a diagram showing particles viewed as waves within a unified integration model.

FIG. 8 is a diagram showing particles viewed as waves within a unified integration model. When particle computation occurs, particles may have a "wave" personality. Wave 800 includes particles 850, 855, and 860 and wave 810 includes particles 865, 870, and 875. As waves 800 and 810 pass through operators 820-840, particle information is viewed as a continuous flow of information rather than a discrete item. Therefore, an operator component begins computation when the wave arrives, and ends computation when the wave ends.

In addition, an "uncertainty principle" allows a system to split a wave and reorder it during processing, and then logically reconstruct the wave into particles. In other words, the actual computation on information represented by a wave may include parallel execution such as pipeline execution and data parallelism. The user, however, may view the wave as if it is in single discrete particle steps.

Figure 9:
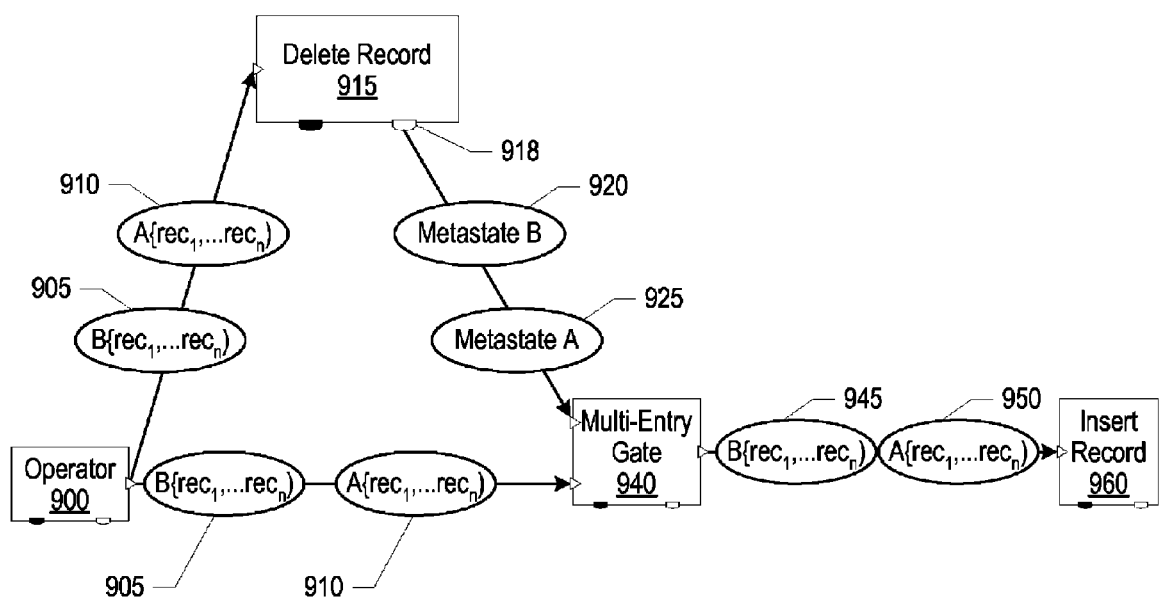
FIG. 9 is a diagram showing an operator component using meta-ports to sequentially process particles.

FIG. 9 is a diagram showing an operator component using meta-ports to sequentially process particles. Operator 900 provides particles 905 and 910 to operator 915 and multi-entry gate 940. As can be seen, the example shown in FIG. 9 shows that an application requires a delete operation (delete record 915) be performed prior to an insert operation (insert record 960).

Delete record operator 915 includes meta-port 918, which provides control data items to operator component 940 using dataflow arcs. Delete record operator 915 produces particles that carry metastates (i.e. control data items) on an arc (metastate A 925 and metastate B 920) for incoming particles that are processed. In one embodiment, the arc subscribes to receiving only a subset of the metastates. Multi-entry gate 940 receives metastate A 925 and metastate B 920, which enables particles 945 and 950 from multi-entry gate 940's data port to pass to insert record 960, thus achieving a required sequential processing.

Figure 10:
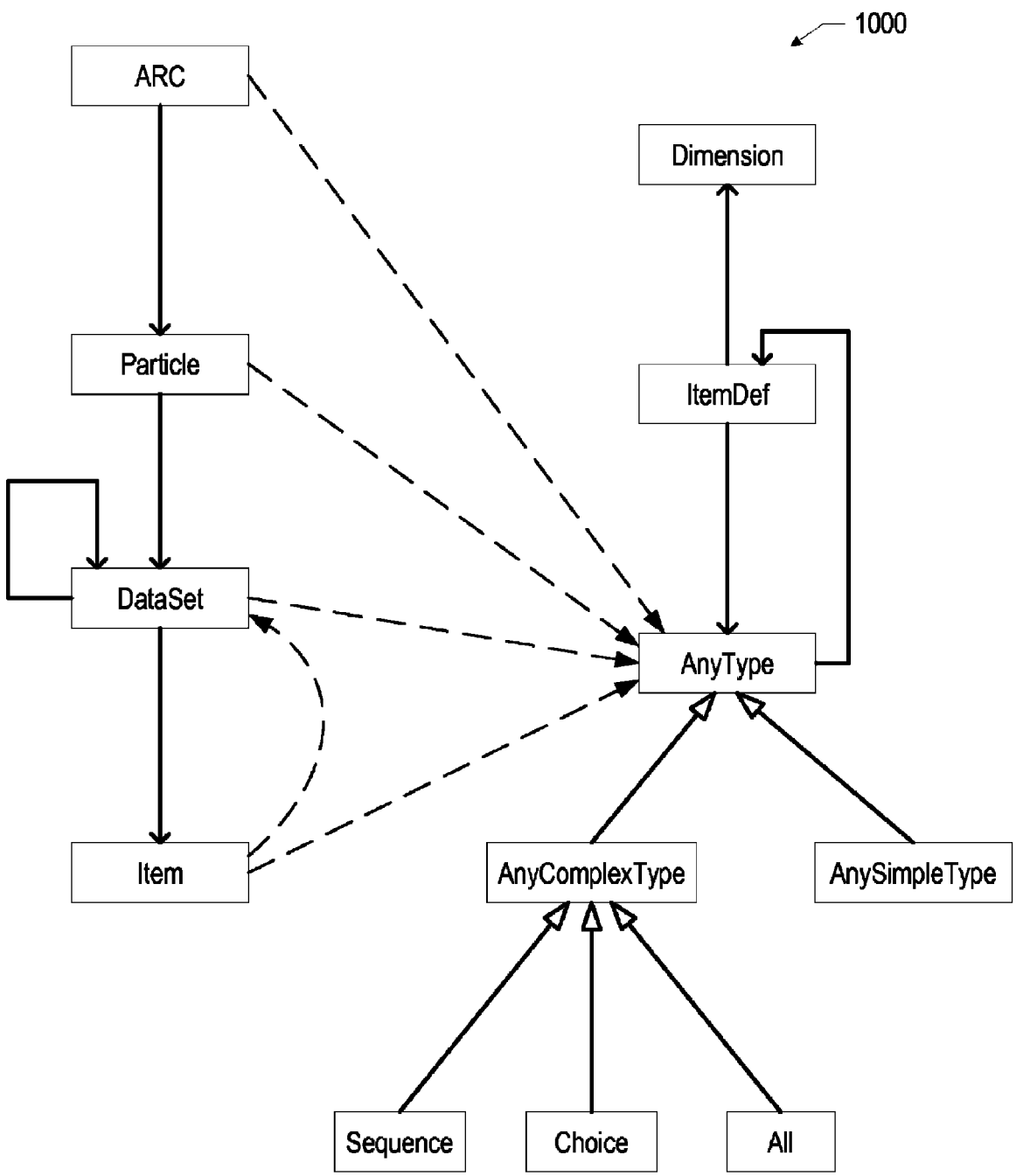
FIG. 10 is a diagram showing a data model.

FIG. 10 is a diagram showing a data model. Data model 1000 is a universal data model that represents all data that may be manipulated by processes expressed using the invention described herein. As one skilled in the art can appreciate, data model 1000 is similar, and has the same expressive power, as existing XPath 1.0/XSchema 1.0 data models in which they are able to describe various hierarchical data structures. As a result, the invention described herein is able to group particles corresponding to a repeating portion of hierarchy of data items.

Figure 11:
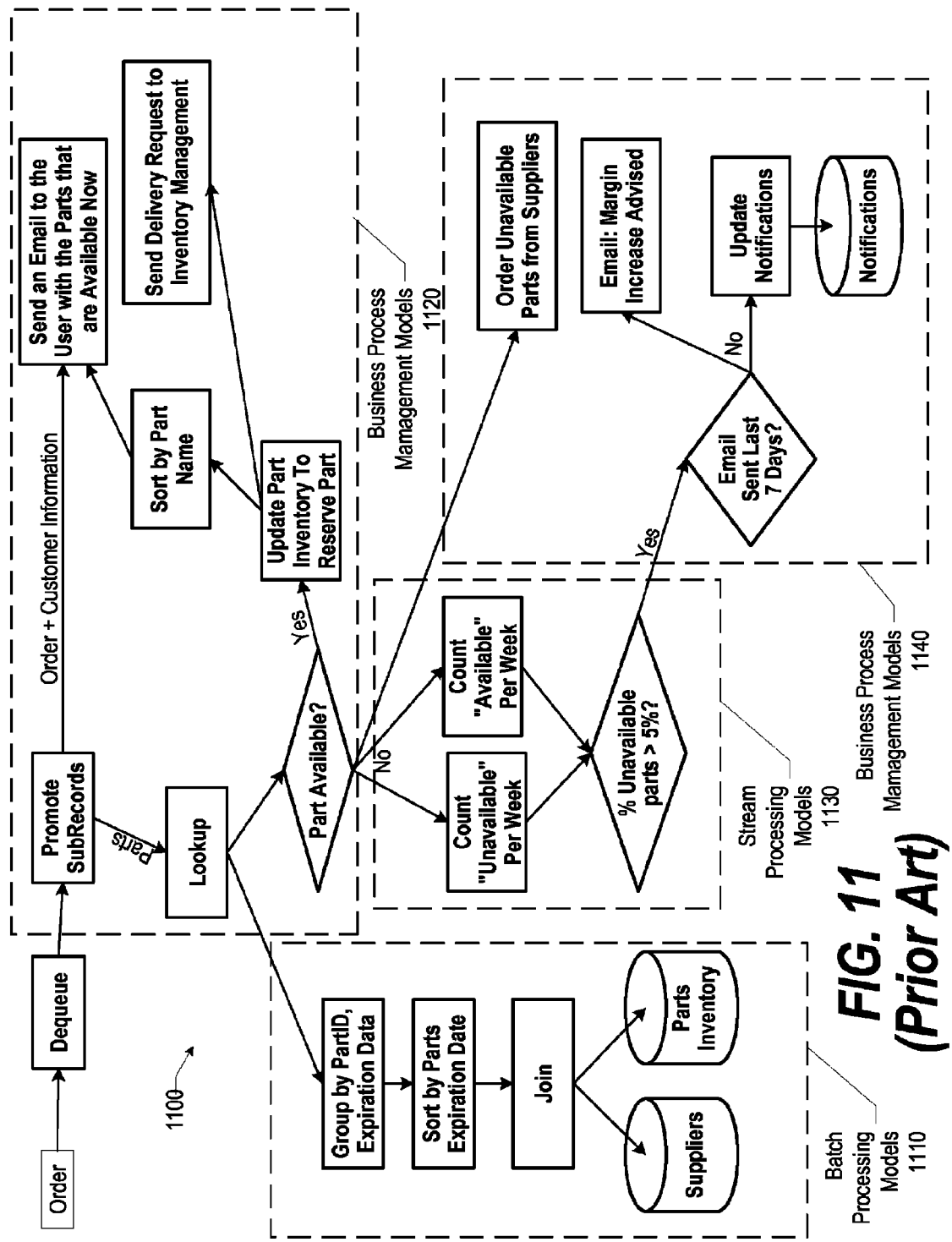
FIG. 11 is a diagram showing prior art requiring different models to express an application.

FIG. 11 is a diagram showing prior art requiring different models to express an application. As can be seen, drawing 1100 requires various models to express an application, which are batch processing models 1110, business process management models 1120 and 1140, and stream processing models 1130. As such, the resultant application must be implemented on different systems to accommodate the different models.

Figure 12:
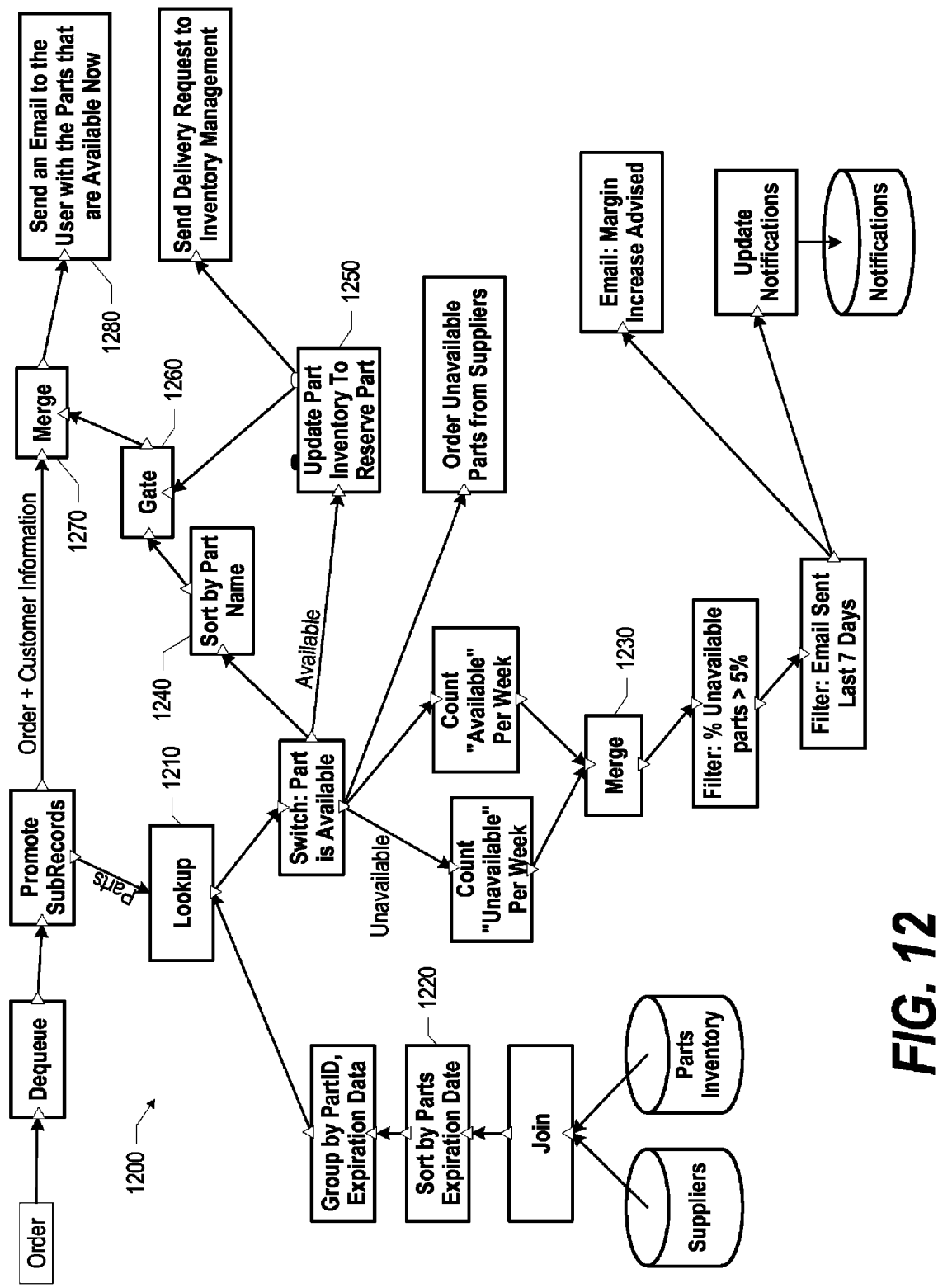
FIG. 12 is a diagram showing an application expressed using a unified integration model and FIG. 13 is a block diagram of a computing device capable of implementing the present invention.

FIG. 12 is a diagram showing an application expressed using a unified integration model. As can be seen, dataflow drawing 1200 does not include artificial boundaries in an application such as that shown in FIG. 11. As a result, dataflow diagram 1200 allows optimizations to determine appropriate implementations for particular design areas.

From a reuse standpoint, the invention described herein allows a user to reuse components and combinations of components in different execution contexts with no difference in implementation or semantics. For example, dataflow diagram 1200 includes operators 1220 and 1240, which are both sort operator components, for different sort functions. Operator 1220 sorts by parts expiration date and operator 1240 sorts by part name. In addition, dataflow diagram 1200 includes operators 1270 and 1230, which are both merge operator components. Operator 1230 merges an unavailable part count per week with an available part count per week, whereas operator 1270 merges order and customer information with available part information.

In addition, dataflow diagram 1200 may include blocks, which are a grouping of operators. These blocks include a block meta-state that corresponds to meta-states of operators that are included in the block. The block also includes a meta port that produces block control data based upon transitions of the block meta-state.

Dataflow diagram 1200 also expresses control dependencies with dataflow semantics, which is shown using operators 1250 and 1260. This combination provides a convenient approach to expressing applications as well as specifying different control levels by changing particle granularity.

Furthermore, dataflow diagram 1200 preserves hierarchical dependencies. As can be seen using operators 1210, 1240, and 1260, single concepts may be separated into multiple concepts with the ability to preserve their hierarchical dependencies.

Figure 13:
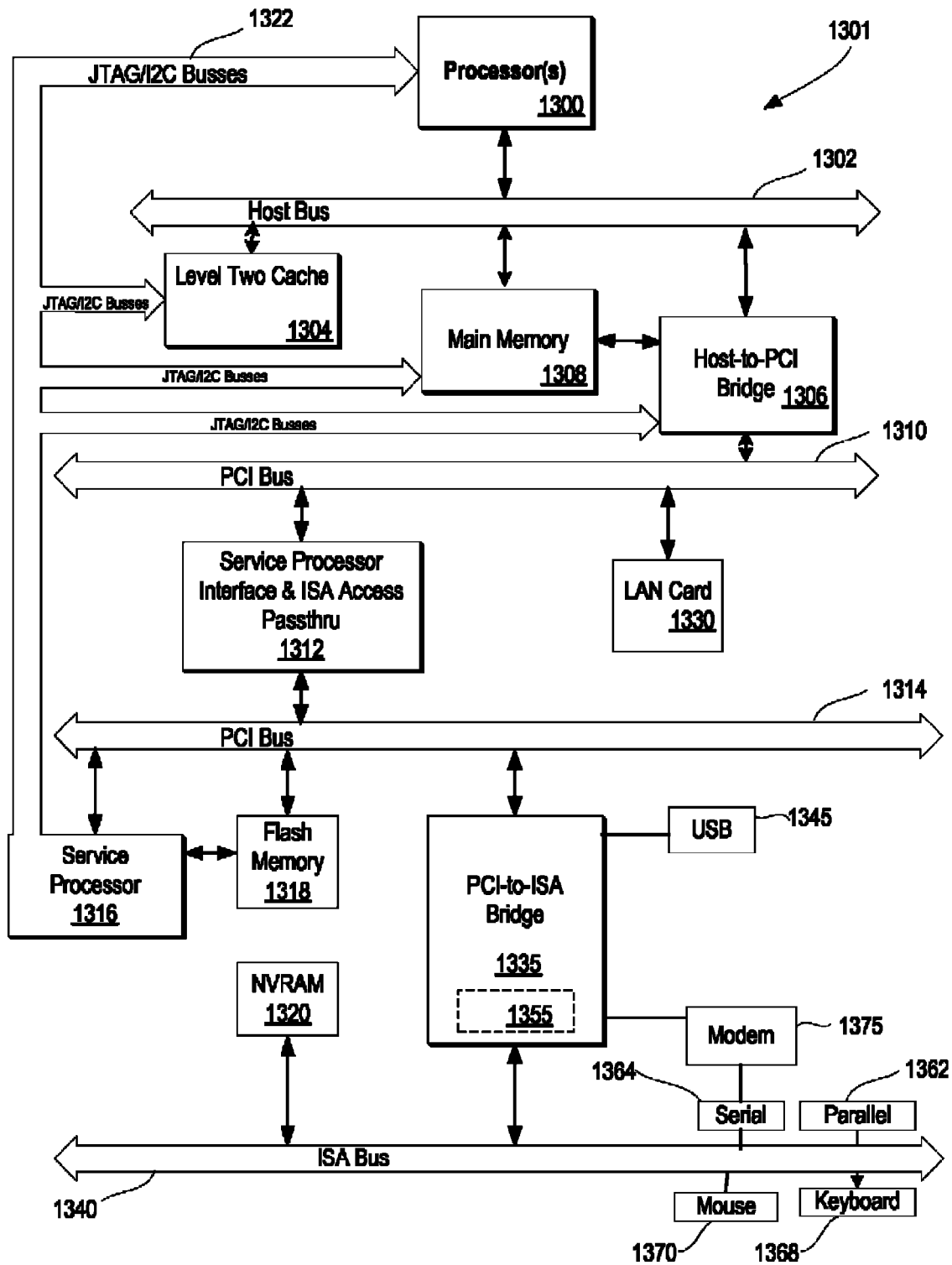

FIG. 13 illustrates information handling system 1301 which is a simplified example of a computer system capable of performing the computing operations described herein. Computer system 1301 includes processor 1300 which is coupled to host bus 1302. A level two (L2) cache memory 1304 is also coupled to host bus 1302. Host-to-PCI bridge 1306 is coupled to main memory 1308, includes cache memory and main memory control functions, and provides bus control to handle transfers among PCI bus 1310, processor 1300, L2 cache 1304, main memory 1308, and host bus 1302. Main memory 1308 is coupled to Host-to-PCI bridge 1306 as well as host bus 1302. Devices used solely by host processor(s) 1300, such as LAN card 1330, are coupled to PCI bus 1310. Service Processor Interface and ISA Access Pass-through 1312 provides an interface between PCI bus 1310 and PCI bus 1314. In this manner, PCI bus 1314 is insulated from PCI bus 1310. Devices, such as flash memory 1318, are coupled to PCI bus 1314. In one implementation, flash memory 1318 includes BIOS code that incorporates the necessary processor executable code for a variety of low-level system functions and system boot functions.

PCI bus 1314 provides an interface for a variety of devices that are shared by host processor(s) 1300 and Service Processor 1316 including, for example, flash memory 1318. PCI-to-ISA bridge 1335 provides bus control to handle transfers between PCI bus 1314 and ISA bus 1340, universal serial bus (USB) functionality 1345, power management functionality 1355, and can include other functional elements not shown, such as a real-time clock (RTC), DMA control, interrupt support, and system management bus support. Nonvolatile RAM 1320 is attached to ISA Bus 1340. Service Processor 1316 includes JTAG and I2C busses 1322 for communication with processor(s) 1300 during initialization steps. JTAG/I2C busses 1322 are also coupled to L2 cache 1304, Host-to-PCI bridge 1306, and main memory 1308 providing a communications path between the processor, the Service Processor, the L2 cache, the Host-to-PCI bridge, and the main memory. Service Processor 1316 also has access to system power resources for powering down information handling device 1301.

Peripheral devices and input/output (I/O) devices can be attached to various interfaces (e.g., parallel interface 1362, serial interface 1364, keyboard interface 1368, and mouse interface 1370 coupled to ISA bus 1340. Alternatively, many I/O devices can be accommodated by a super I/O controller (not shown) attached to ISA bus 1340.

In order to attach computer system 1301 to another computer system to copy files over a network, LAN card 1330 is coupled to PCI bus 1310. Similarly, to connect computer system 1301 to an ISP to connect to the Internet using a telephone line connection, modem 13135 is connected to serial port 1364 and PCI-to-ISA Bridge 1335.

While FIG. 13 shows one information handling system that employs processor(s) 1300, the information handling system may take many forms. For example, information handling system 1301 may take the form of a desktop, server, portable, laptop, notebook, or other form factor computer or data processing system. Information handling system 1301 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for simulating data flow using a dataflow computing system, the method comprising:
    a dataflow diagram that includes a plurality of operators, wherein each of the operators includes at least one input port or at least one output port;
    a plurality of arcs, wherein each of the arcs connects one of the output ports of one of the plurality operators to one of the input ports of a different one of the plurality of operators;
    a plurality of data items that flow in streams along the plurality of arcs between the plurality of operators;
    grouping the plurality of data items into a particle at a first operator included in the plurality of operators to form a particle grouping, wherein the first operator includes meta ports, wherein the meta ports include an arc-level meta port and a particle-level meta port, wherein the arc-level meta-port provides an arc-level meta-state that holds the state execution from a process initialization point to a process termination point, and wherein the particle-level meta-port provides a particle-level meta-state that provides an execution state of an input particle at any given point of time;
    performing, at the first operator, computations on the particle grouping, resulting in a computed plurality of data items;
    transmitting, from the first operator, the computed plurality of data items over one of the plurality of arcs to a second operator included in the plurality of operators;
    producing control data items at one of the meta ports included on the first operator based upon meta-state transitions that are in response to the computations performed by the first operator on the particle grouping; and
    transmitting the control data items from the first operator to one of the plurality of operators, wherein the control data items control the flow of the computed plurality of data items.

2. The method of claim 1 wherein the control data items control the flow of the computed plurality of data items using a gate operator, the gate operator preventing the computed plurality of data items from reaching one of the plurality of operators until the control data items instruct the gate operator to provide the computed plurality of data items to the one of the plurality of operators.

3. The method of claim 1 wherein the control data items are transmitted to the second operator, the control data items instructing the second operator a time at which to process the computed plurality of data items.

4. The method of claim 1 wherein the arc connected to one of the meta ports subscribes to receiving a subset of the plurality of control data items.

5. The method of claim 1 wherein the particle grouping corresponds to a repeating portion of a hierarchy in a hierarchical data model of the plurality of data items flowing on the plurality of arcs.

6. The method of claim 1 wherein the particle grouping further comprises:
    coupling the plurality of control data items to external resource manipulation in order to indicate the start of or completion of the external resource manipulation.

7. The method of claim 1 wherein the method includes parallel execution of the plurality of data items using the plurality of operators.

8. The method of claim 7 wherein the parallel execution is selected from the group consisting of a pipelined execution and a data-parallel execution.

9. The method of claim 1 wherein the method further includes one or more stateful operators that accumulate state across the plurality of data items included in the particle.

10. The method of claim 1 further comprising:
compiling the dataflow diagram into sequential executable code.

11. The method of claim 1 wherein the first operator includes a meta-state that corresponds to a current processing state associated with the computations performed on the plurality of data items included in the particle.

12. The method of claim 1 further comprising:
expressing a control dependency between a plurality of activities.

13. The method of claim 1 wherein the first operator and the second operator are independent processing constructs.

14. The method of claim 1 wherein the dataflow diagram includes a block, the block including the first operator and the second operator.

15. The method of claim 14 wherein the block includes a block meta-state that corresponds to meta-states associated with the first operator and the second operator.

16. The method of claim 15 wherein the block includes a block meta port that produces block control data based on transitions of the block meta-state.

17. The method of claim 1 further comprising:
wherein the dataflow diagram corresponds to a batch data processing application;
wherein the dataflow diagram corresponds to a stream data processing application;
wherein the dataflow diagram corresponds to an event processing application;
wherein the dataflow diagram includes graphical notations; and
wherein the dataflow diagram includes a non-graphical language implementation.

18. A computer program product stored on a computer memory, the computer memory containing instructions for execution by a computer, which, when executed by the computer, cause the computer to implement a method for simulating data flow, the method comprising:
a dataflow diagram that includes a plurality of operators, wherein each of the operators includes at least one input port or at least one output port;
a plurality of arcs, wherein each of the arcs connects one of the output ports of one of the plurality operators to one of the input ports of a different one of the plurality of operators;
a plurality of data items that flow in streams along the plurality of arcs between the plurality of operators;
grouping the plurality of data items into a particle at a first operator included in the plurality of operators to form a particle grouping, wherein the first operator includes meta ports, wherein the meta ports include an arc-level meta port and a particle-level meta port, wherein the arc-level meta-port provides an arc-level meta-state that holds the state execution from a process initialization point to a process termination point, and wherein the particle-level meta-port provides a particle-level meta-state that provides an execution state of an input particle at any given point of time;
performing, at the first operator, computations on the particle grouping, resulting in a computed plurality of data items;
transmitting, from the first operator, the computed plurality of data items over one of the plurality of arcs to a second operator included in the plurality of operators;
producing control data items at one of the meta ports included on the first operator based upon meta-state transitions that are in response to the computations performed by the first operator on the particle grouping; and
transmitting the control data items from the first operator to one of the plurality of operators, wherein the control data items control the flow of the computed plurality of data items.

19. The computer program product of claim 18 wherein the method further comprises:
controlling flow, based upon the control data items, of the computed plurality of data items using a gate operator, the gate operator preventing the computed plurality of data items from reaching one of the plurality of operators until the control data items instruct the gate operator to provide the computed plurality of data items to the one of the plurality of operators.

20. The computer program product of claim 18 wherein the method further comprises:
transmitting the control data items to the second operator, the control data items instructing the second operator a time at which to process the computed plurality of data items.

21. The computer program product of claim 18 wherein the particle grouping corresponds to a repeating portion of a hierarchy in a hierarchical data model of the plurality of data items flowing on the plurality of arcs.

22. The computer program product of claim 18 wherein the method further comprises:
coupling the plurality of control data items to external resource manipulation in order to indicate the start of or completion of the external resource manipulation.

23. The computer program product of claim 18 wherein the method includes parallel execution of the plurality of data items using the plurality of operators; and wherein the parallel execution is selected from the group consisting of a pipelined execution and a data-parallel execution.

24. The computer program product of claim 18 wherein the method further comprises:
compiling the dataflow diagram into sequential executable code.

25. The computer program product of claim 18 wherein the method further comprises:
expressing a control dependency between a plurality of activities.

26. The computer program product of claim 18 wherein the method further comprises:
wherein the arc connected to the meta port subscribes to receiving a subset of the plurality of control data items;
wherein the dataflow diagram includes a block, the block including the first operator and the second operator;
wherein the block includes a block meta-state that corresponds to meta-states associated with the first operator and the second operator;
wherein the block includes a block meta port that produces block control data based on transitions of the block meta-state;
wherein the first operator and the second operator are independent processing constructs;
wherein the first operator includes a meta-state that corresponds to a current processing state associated with the computations performed on the plurality of data items included in the particle;

wherein the method further includes one or more stateful operators that accumulate state across the plurality of data items included in the particle;

wherein the dataflow diagram corresponds to a batch data processing application; wherein the dataflow diagram corresponds to a stream data processing application;

wherein the dataflow diagram corresponds to an event processing application; wherein the dataflow diagram includes graphical notations; and wherein the dataflow diagram includes a non-graphical language implementation.

27. An information handling system comprising:
one or more processors;
a memory accessible by the processors;
a storage device accessible by the processors; and
a dataflow computing system for simulating dataflow, the dataflow computing system being effective to:
include a plurality of operators in a dataflow diagram, wherein each of the operators includes at least one input port or at least one output port;
include a plurality of arcs in the dataflow diagram, wherein each of the arcs connects one of the output ports of one of the plurality operators to one of the input ports of a different one of the plurality of operators;
include a plurality of data items that flow in streams along the plurality of arcs between the plurality of operators;
group the plurality of data items into a particle at a first operator included in the plurality of operators to form a particle grouping, wherein the first operator includes meta ports, wherein the meta ports include an arc-level meta port and a particle-level meta port, wherein the arc-level meta-port provides an arc-level meta-state that holds the state execution from a process initialization point to a process termination point, and wherein the particle-level meta-port provides a particle-level meta-state that provides an execution state of an input particle at any given point of time;
perform, at the first operator, computations on the particle grouping, resulting in a computed plurality of data items;
transmit, from the first operator, the computed plurality of data items over one of the plurality of arcs to a second operator included in the plurality of operators;
produce control data items at one of the meta ports included on the first operator based upon meta-state transitions that are in response to the computations performed by the first operator on the particle grouping; and
transmit the control data items from the first operator to one of the plurality of operators, wherein the control data items control the flow of the computed plurality of data items.

28. The information handling system of claim 27 wherein the dataflow computing system is further effective to:
control flow, based upon the control data items, of the computed plurality of data items using a gate operator, the gate operator preventing the computed plurality of data items from reaching one of the plurality of operators until the control data items instruct the gate operator to provide the computed plurality of data items to the one of the plurality of operators.

29. The information handling system of claim 27 wherein the dataflow computing system is further effective to:
transmit the control data items to the second operator, the control data items instructing the second operator a time at which to process the computed plurality of data items.

30. The information handling system of claim 27 wherein the particle grouping corresponds to a repeating portion of a hierarchy in a hierarchical data model of the plurality of data items flowing on the plurality of arcs.

31. The information handling system of claim 27 wherein the dataflow computing system is further effective to:
couple the plurality of control data items to external resource manipulation in order to indicate the start of or completion of the external resource manipulation.

32. The information handling system of claim 27 wherein the dataflow computing system includes parallel execution of the plurality of data items using the plurality of operators; and wherein the parallel execution is selected from the group consisting of a pipelined execution and a data-parallel execution.

33. The information handling system of claim 27 wherein the dataflow computing system is further effective to:
compile the dataflow diagram into sequential executable code.

34. The information handling system of claim 27 wherein the dataflow computing system is further effective to:
express a control dependency between a plurality of activities.

35. The information handling system of claim 27 wherein the arc connected to the meta port subscribes to receiving a subset of the plurality of control data items;
wherein the dataflow diagram includes a block, the block including the first operator and the second operator;
wherein the block includes a block meta-state that corresponds to meta-states associated with the first operator and the second operator;
wherein the block includes a block meta port that produces block control data based on transitions of the block meta-state;
wherein the first operator and the second operator are independent processing constructs;
wherein the first operator includes a meta-state that corresponds to a current processing state associated with the computations performed on the plurality of data items included in the particle;
wherein the method further includes one or more stateful operators that accumulate state across the plurality of data items included in the particle;
wherein the dataflow diagram corresponds to a batch data processing application;
wherein the dataflow diagram corresponds to a stream data processing application;
wherein the dataflow diagram corresponds to an event processing application;
wherein the dataflow diagram includes graphical notations; and
wherein the dataflow diagram includes a non-graphical language implementation.

* * * * *